United States Patent [19]
Amzajerdian et al.

[11] Patent Number: 5,317,376
[45] Date of Patent: May 31, 1994

[54] SOLID STATE PULSED COHERENT LASER RADAR FOR SHORT RANGE VELOCIMETRY APPLICATIONS

[75] Inventors: Farzin Amzajerdian, Thousand Oaks; Eli Margalit, Calabasas, both of Calif.

[73] Assignee: Litton Systems, Inc., Beverly Hills, Calif.

[21] Appl. No.: 984,794

[22] Filed: Dec. 3, 1992

[51] Int. Cl.$^5$ .............................................. G01C 3/08
[52] U.S. Cl. ....................................... 356/28.5; 356/5
[58] Field of Search ................................. 356/5, 28.5

[56] References Cited

U.S. PATENT DOCUMENTS

| | | | |
|---|---|---|---|
| 3,431,504 | 3/1969 | Adler | 329/315 |
| 3,856,402 | 12/1974 | Low et al. | 356/5 |
| 4,298,280 | 11/1981 | Harney | 356/5 |
| 4,447,149 | 5/1984 | Marcus et al. | 356/5 |
| 4,505,582 | 3/1985 | Zuleeg et al. | 356/5 |
| 4,690,551 | 9/1987 | Edwards et al. | 356/5 |
| 4,995,720 | 2/1991 | Amzajerdian | 356/5 |
| 5,099,486 | 3/1992 | Acharekar et al. | 372/32 |
| 5,157,677 | 10/1992 | Narhi et al. | 372/32 |

OTHER PUBLICATIONS

Goldstein, et al, "Characteristics of a Traveling-Wave Ruby Single-Mode Laser as a Laser Radar Transmitter", (Sep. 1966), pp. 591–523, IEEE Journal of Quantum Electronics, vol. QE-2, No. 9.

Menzies, et al., "Atmospheric aerosol backscatter measurements using a tunable coherent $CO_2$ lidar" (Aug. 1, 1984), pp. 2510–2517, Journal of Applied Optics, vol. 23, No. 15.

Henderson, et al., "Eye-safe coherent laser radar system at 2.1 $\mu m$ using Tm,Ho:YAG lasers", (May 15, 1991), pp. 773–775, Optic Letters, vol. 16, No. 10.

Johnson et al., "Simple method for electronic feedback stabilization of an actively mode-locked and Q-switched Nd:YLF laser", (May 1, 1987), article presented at the Conference on Laser and Electro-optics, Infrared Solid-State Lasers Section, Baltimore, Md.

Primary Examiner—Mark Hellner
Attorney, Agent, or Firm—Edmund W. Rusche

[57] ABSTRACT

The invention presents a method and apparatus for utilizing a single frequency, self seeding laser pulse signal transmitted to create a target beam to be projected toward an atmospheric target whereby a portion will be reflected back upon itself, and a local oscillator beam constructed to a shape approximating a low level elongated square wave pulse to be heterodyned with the returning target beam. A radio frequency voltage drives an acousto-optic modulator and amplitude modulates the local oscillator beam to form an optical output that is a flat top pulse resembling a square wave function. The local oscillator beam and returning target beam are polarization adjusted to match and are then combined and focused onto detector. The system is effective for use as an aircraft velocimeter.

38 Claims, 2 Drawing Sheets

SOLID STATE PULSED COHERENT LASER RADAR FOR SHORT RANGE VELOCIMETRY APPLICATIONS

BACKGROUND OF THE INVENTION

Pulsed coherent laser radar is capable of remote measurements of atmospheric winds and turbulences over ranges of several kilometers. A pulsed coherent laser radar can also be used for shorter range applications where high degrees of accuracy and integrity are required. This invention relates to such short range application in general and the measurement of aircraft air data in particular.

A coherent laser radar as an aircraft air data sensor uses the aerosols in the atmosphere to scatter some of the transmitted energy from the laser source back to a receiver where the Doppler shift is used to measure the aircraft velocity component along the transmitter line of sight. By pointing the laser beam in three or more directions, the aircraft true speed and angles of attack and sideslip can be measured. Compared with continuous wave laser radar, a pulsed system can provide more accurate and reliable measurements. This is due to the enhanced return signal from high peak power pulses.

A pulsed coherent laser radar based on the conventional Injection-Seeded Oscillator/Amplifier (ISOA) technique uses a highly stable low power continuous wave laser as master oscillator and a Q-switched pulse laser as slave laser. This laser system utilizes a feedback control system for injection locking of the two laser frequencies. The feedback control consists of a detector for monitoring the slave laser spectral characteristics, electronic circuitry generating control signals, and a piezoelectric translator for adjusting the slave laser resonator length. In this technique, part of the master oscillator is used as an optical local oscillator and the remaining part for injection seeding of the slave laser. The output of the slave laser is then transmitted through a telescope into the atmosphere.

Recently, a pulsed coherent laser radar was developed that used a single laser source to generate both the transmitter and local oscillator beams. This technique utilizes the self-seeding technique to generate single frequency pulses to be transmitted. By actively controlling the laser Q-switched transmission, a low power quasi-continuous wave pulse is generated that trails the Q-switched pulse. The trailing portion is separated from the Q-switched pulse and is used as the local oscillator.

The technique described in this disclosure also utilizes the self-seeding technique for generating single frequency pulses. However, the additional feedback control loop for generation of the trailing quasi-continuous wave beam has been eliminated to further simplify the system design. This is achieved by utilizing an optical modulator device to modulate the intensity of a portion of the laser pulse generating a flat top pulse suitable as a local oscillator. This technique is best suited for short range applications, since the local oscillator flat top pulse width needs to be equal to or longer than the transmitter round trip time to the desired range.

An object of this invention is to present a method and apparatus for interferometric laser measurement of short range atmospheric conditions.

A second object of this invention is to present a method and apparatus for single frequency laser interferometric measurement of short range atmospheric conditions, e.g., as applied to aircraft true airspeed, angle of attack and angle of sideslip.

A further object of this invention is to present a pulsed coherent laser radar as an aircraft air data sensor which uses the aerosols in the atmosphere to scatter some of the transmitted energy from the laser source back to a receiver where the Doppler shift is used to measure the aircraft velocity component along the transmitter line of sight.

SUMMARY OF THE INVENTION

The invention presents a method and apparatus for utilizing a siqgle frequency pulse signal transmitted to create a target beam to be projected toward an atmospheric target whereby a portion will be reflected back upon itself, and a local oscillator beam constructed to a shape approximating a low level elongated square wave pulse to be heterodyned with the returning target beam. The local oscillator flat top or square wave pulse must be equal to or longer than the transmitter round trip time to the desired range.

The local oscillator beam is created by taking a portion of the laser beam pulse and frequency shifting and amplitude modulating it by an acousto-optic modulator (AOM). The AOM operates in pulse mode and is turned on only during the detection period. A radio frequency (RF) voltage drives the AOM and amplitude modulates d to form an optical output that is a flat top pulse resembling a square wave function. The local oscillator beam and returning target beam are polarization adjusted to match and are then combined and focused onto a detector.

By mixing the local oscillator beam with the target return signal (heterodyne detection), the detector produces an electrical signal whose frequency is equal to the Doppler frequency shift plus an offset frequency. The Doppler frequency shift is caused by the relative motion of the laser radar and atmospheric aerosols. For aircraft air data application, this Doppler frequency shift is directly related to the aircraft velocity with respect to the air mass. The offset frequency is produced by the AOM allowing the determination of wind velocity and direction during system initialization phase on the ground prior to takeoff. Interferometric analysis can also be conducted to study and measure changes in phase between the beams.

Polarization control of the target and local oscillator beams has been accomplished by establishing the laser pulse emitted by the laser source as plane polarized. The target beam is converted to circular polarization and is then directed toward the atmospheric aerosol body determined for analysis. The energy reflected by the aerosol body back toward the system is received and converted to a plane polarized signal. During the same time frame the part of the plane polarized laser source beam that becomes the local oscillator beam is maintained in a plane polarized condition, but adjusted with its plane of polarization parallel with the returning target beam at or prior to their combination before detection.

DESCRIPTION OF THE PREFERRED EMBODIMENT

Figure 1:
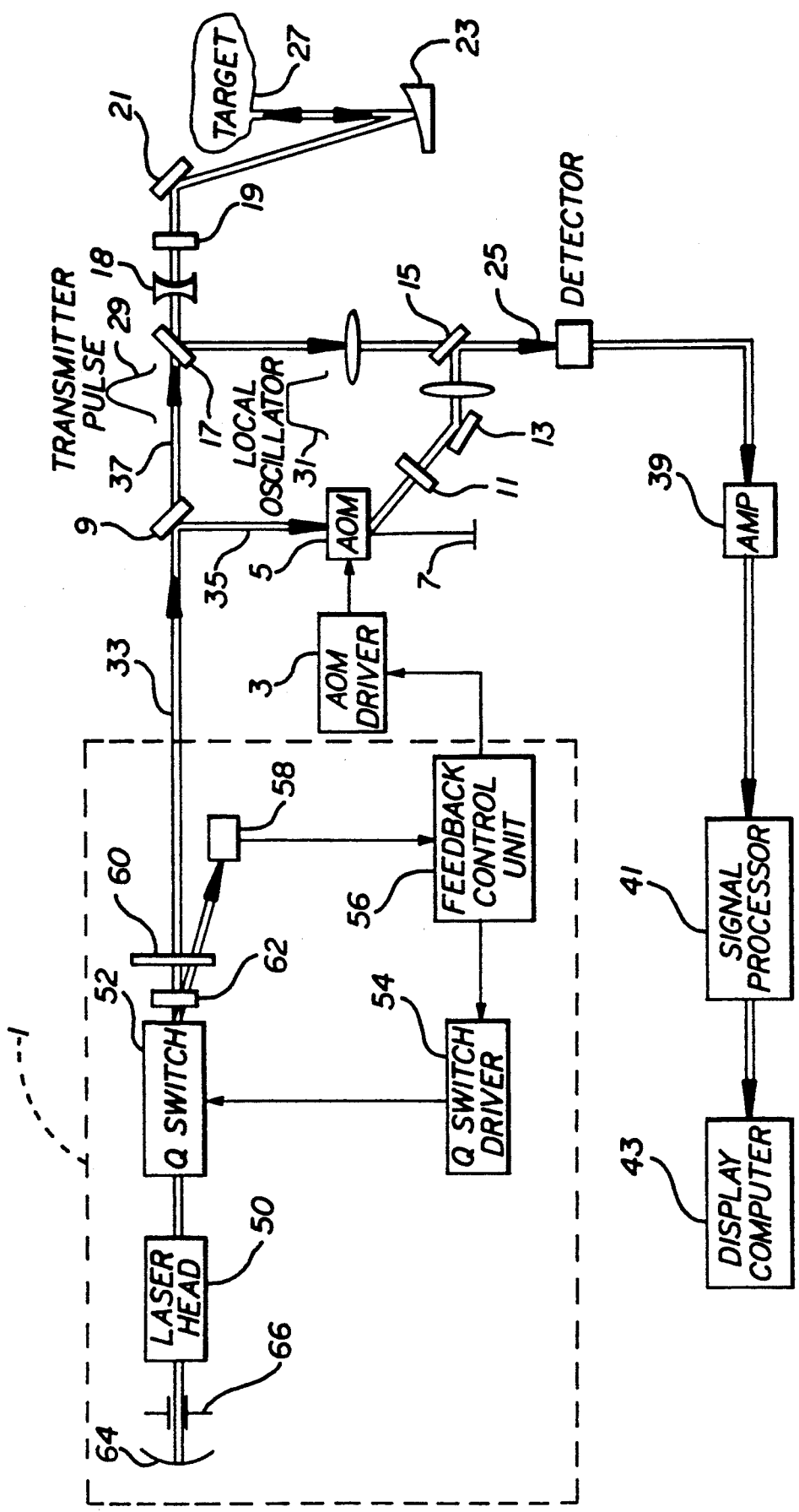
FIG. 1 is a schematic block diagram showing the pulsed coherent laser radar system for the preferred embodiment.
Figure 2:
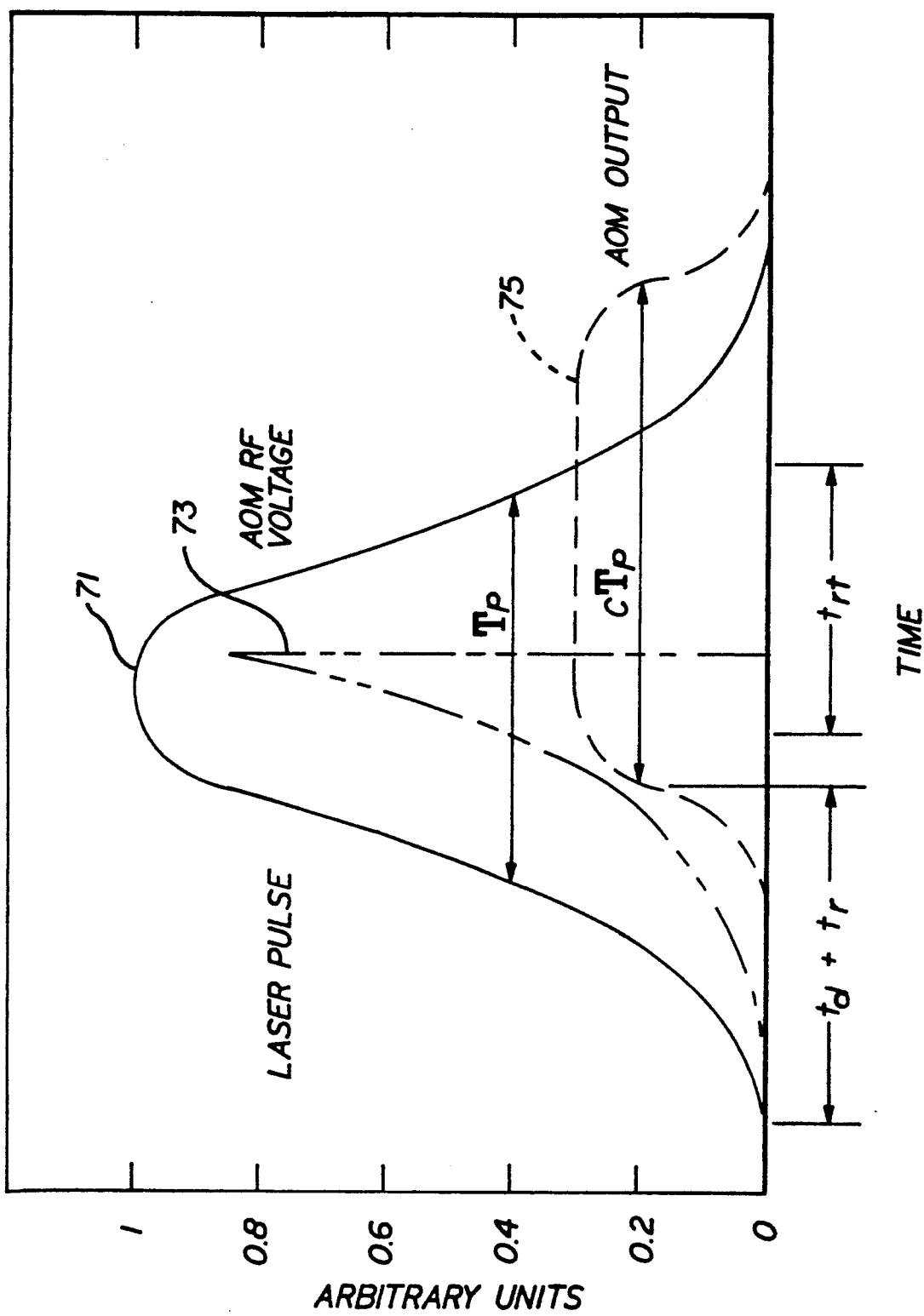
FIG. 2 shows graphic plots for the laser pulse, the AOM driver signal and the local oscillator waveform after forming by the AOM.

The preferred embodiment of this laser system is presented in FIGS. 1 and 2. FIG. 1 contains the schematic of the complete laser system in use as a coherent laser radar device for detecting characteristics of an atmospheric aerosol target. Details are also shown of a prior art laser source.

The laser source 1 is a single frequency, high power pulse emitting source. In the preferred embodiment an active controlled self-seeded laser was used for generating the single frequency, high energy pulse 29. High powered pulse 29 is emitted along path 33. This laser pulse is split into a target beam directed along path 37 and a local oscillator beam directed along path 35. The laser beam emitted from laser source 1 is plane polarized and in FIG. 1 is in the plane of the paper. After passing through beam splitter 9 target beam 37 and local oscillator beam 35 are both also plane polarized in the surface of the drawing.

The target beam 37 continues, passing through Brewster polarizer 17 and interacting with a quarter-wave plate 19 which converts its from plane polarized radiation to circularly polarized radiation. The beam is then directed to a target medium which in our case has been an atmospheric aerosol medium. As shown in FIG. 1, a telescope is utilized to direct the target beam to target 27. As constructed a mirror 21 directs target beam 37 to reflect off of off-axis parabolic mirror 23 and therefrom to be directed to target 27. A negative lens 18 expands target beam 37 to be focused at the desired range by off-axis parabolic mirror 23.

Some energy from the target beam will be reflected back upon itself from target 27 and will return to the laser system through the telescope via parabolic mirror 23 and mirror 21 to again interact with quarter-wave polarizer 19. Quarter-wave plate 19 now converts the returning circularly polarized energy to linear polarization.

The returning target beam then reflects off Brewster polarizer 17 where polarization of this returning beam is limited to continue only in a plane polarized manner with its plane oriented perpendicular to the plane of FIG. 1. The returning target beam is then directed toward a detector 25 to be mixed with local oscillator beam 35 for heterodyne detection.

Coherent detection (optical heterodyning) requires a local oscillator beam that is both temporally and spectrally stable over the entire detection period. In this invention, a portion of the single frequency laser source pulse is intensity modulated by an optical modulation device to generate the local oscillator beam. In the preferred embodiment system design of FIG. 1, an acousto-optic modulator (AOM) 5 has been used as the modulating device.

AOM 5, operating based on the Bragg diffraction principle, deflects the laser beam and shifts its frequency with the application of a radio frequency (RF) voltage. The deflection efficiency of AOM 5 is related to the applied RF power from AOM driver 3. Therefore, by modulating the applied RF voltage, the intensity of the deflected laser beam can be varied with time. A beam stop 7 is placed after AOM 5 and collinear with the path of local oscillator beam 35 as it enters AOM 5 in order to absorb that part of the beam which is not deflected by AOM 5.

The AOM timing is synchronized with the firing of a Q-switched pulse by the source laser feedback control unit 56. It is this pulse that becomes the transmitter pulse 29 directed along path 33. The source laser comprises a laser head 50, mirror 64, partially reflecting mirror 60, etalon 62, aperture 66, Q-switch 52, detector 58, feedback control unit 56 and Q-switch driver 54. Feedback control unit 56 also is connected to control operation of driver 3 for AOM 5. The structure of the laser source is described in U.S. Pat. No. 5,157,677 of one of the present inventors.

The laser source feedback control system, comprising detector 58 and feedback control unit 56, monitors the energy build-up inside the laser cavity during the self-seeding phase. Once the energy builds to a predetermined level, the feedback control system opens Q-switch 52 allowing the generation of a single frequency pulse. Feedback control unit 56 also generates a trigger signal with a predetermined delay equal to the summation of the time delay associated with the generation of the Q-switched pulse and the round trip time of transmitted beam minus the AOM reaction time to AOM driver 3. AOM driver 3 in turn generates a burst of amplitude modulated RF signal. Since feedback control unit 56 controls the timing of the generated pulse from laser source 1, it is also able to synchronize the operation of AOM 5 with great accuracy.

FIG. 2 further illustrates the generation of the local oscillator beam from the source laser pulse 29 using AOM 5. The temporal profile of laser source pulse 71 can be represented by $$P(t) = P_0 e^{-(t/\tau_p)^2} \quad \text{Eq. (1)}$$

where $P_0$ is the laser peak power and $\tau_P$ is its pulsewidth. A portion of this pulse is directed through AOM 5 after having been split and directed by beam splitter 9.

The output of AOM 5 is approximately a linear function of applied RF power 73 from AOM driver 3, and is given by $$P_{AOM}(t) \approx \eta [V_{RF}(t - t_d)]^2 r P(t) \quad \text{Eq. (2)}$$

where $\eta$ is the AOM deflection efficiency, $V_{RF}$ is the applied voltage, $t_d$ is the time delay associated with AOM 5, and r is the fraction of the laser energy directed toward local oscillator path 35 by beam splitter 9.

The AOM applied voltage 73 is an amplitude modulated burst of RF signal. The timing of this signal is controlled by feedback control unit 56, allowing enough time for the transmitted beam to travel to the designated range for target 27 and back to the transmitter/receiver end at the parabolic mirror 23. Feedback control unit 56 also takes into account the time delay associated with the AOM 5. AOM 5 time delay is the time required for acoustic waves to travel across the AOM crystal and through the laser beam. The amplitude of the applied voltage 73 is modulated such that its instantaneous power is inversely proportional to the laser source pulse power. The applied voltage to AOM can be written $$V_{RF}(t) = V_0 \cos(\omega_m t) e^{(\frac{t+t_d}{\sqrt{2\tau_p}})^2} [u(t + t_d + t_r - t_{rt} + C\tau_p) - \quad \text{Eq. (3)}$$

-continued $$u(t + t_d + t_r - t_{rt} - C\tau_p)]$$

where
- $V_0$ = amplitude of applied voltage
- $\omega_m$ = frequency of applied voltage
- $u$ = step function
- $t_r$ = AOM rise time
- $t_{rt}$ = round trip time of transmitted pulse
- $C$ = constant greater than unity.

The exponential quantity in Eq. (3) is the modulation signal which is the inverse of Eq. (1) with the appropriate AOM time delay. In Eq. (3), the rise and fall times of the applied voltage have been neglected, since they are much smaller than those of the AOM. Substituting Eqs. (1) and (3) in Eq. (2), the AOM output 75 can be written as $$P_{AOM}(t) = \qquad \text{Eq (4)}$$

$$0.5 \eta r V_0^2 P_0 \left[ u(t + t_r - t_{rt} + C t_p) \left( 1 - e^{-(\frac{t+t_r-t_{rt}+Ct_p}{t_r})^2} \right) - u(t + t_d + t_r - t_{rt} - Ct_p) e^{-(\frac{t+t_r-t_{rt}-Ct_p}{t_r})^2} \right]$$

FIG. 2 shows source laser pulse 71, the envelope of the RF voltage 73 which drives AOM 5 and the output local oscillator laser signal 75 from AOM 5 as functions of time, each with a different scaling factor. The constant C is a design parameter greater than unity ensuring that the local oscillator pulse 75 is longer than the laser 1/e pulsewidth. This is necessary to eliminate any additional frequency broadening of the return target signal by mixing it with the local oscillator signal.

The local oscillator beam, after being formed by AOM 5, passes through halfwave plate 11 which rotates its plane of polarization by 90°. It then is reflected by mirror 13 and beam splitter mirror 15 to be combined with the returning target pulse for detection at detector 25. Various lenses may be used in either or both the local oscillator and target beam paths to allow adjustment and control of the beams.

Detector 25 outputs its signal through amplifier 39 and to a signal processor 41 and display computer 43. The heterodyne signal is analyzed to determined the Doppler frequency shift caused by the relative motion of the laser target pulse width the atmospheric aerosols. For aircraft air data application, this Doppler frequency shift is directly related to the aircraft velocity with respect to the air mass. An offset frequency can be produced by AOM 5 allowing the determination of wind velocity and direction during system initialization phases on the ground prior to take off.

In the preferred embodiment system, a solid state Holmium laser (Tm, Ho:YSGG) operating at 2.1 micron wavelength has been used as the source. Other lazing mediums would work effectively as well. The one 1/e pulsewidth ($\tau_P$) of the laser is about 180 nanoseconds. In addition to being eye-safe, the Holmium laser has the advantage of generating long Q-switch pulses needed to meet the velocity accuracy requirements of aircraft air data measurements. In the design of this system, the range has been chosen to be R=30 meters, giving a round trip time of 200 nanoseconds ($t_{rt}$=2R/c where c is the speed of light). The time delay and the rise time of the AOM are 300 and 100 nanoseconds respectively. The value of the parameter C in Eqs. (3) and (4) was chosen to be $\sqrt{2}$ and r=0.05.

Also to be noted is that in the preferred embodiment, an electro-optic modulator may be used in place of AOM 5. However, the use of an electro-optic modulator may make difficult the provision of the offset frequency that may be necessary for an on-the-ground system initialization and measurement for small velocity components. Additionally, the off-axis Dall Kirham (parabolic) telescope used herein may be replaced by other types of telescopes such as the Galilean which uses two tensing elements to perform the same function. It should also be mentioned that the technique described in this disclosure is applicable to other solid state laser's including Thulium, Holmium:YAG (Tm, Ho:YAG), Thulium, Holmium:YLF (Tm, HO:YLF) Thulium:YAG (Tm:YAG) and Neodymiun:YAG (Nd:YAG) lasers.

While this invention has been described with reference to its presently Preferred Embodiment, its scope is not limited thereto. Rather such scope is only limited insofar as defined by the following set of claims and includes all equivalence thereof.

What is claimed is:

1. A single frequency laser system, wherein a high energy pulse signal is generated as an analysis beam and a lower energy flat top pulse is generated as a reference beam, both being generated from a laser source single frequency pulse signal, said laser system capable of providing interferometric type analysis of the two beams when heterodyned, which comprises:
   a laser source which generates a single frequency, high energy pulse signal beam plane polarized in a preselected plane;
   means for splitting said pulse signal beam simultaneously into an analysis beam and a reference beam;
   means for directing said analysis beam to an external target whereby part of said analysis beam energy will become a reflected beam returning back upon itself;
   means for reforming said reference beam into a lower energy, flat top signal of a preset time period set to extend for a minimum time period which covers the transit time of said analysis beam to a target medium and back to said laser system;
   means for receiving said reflected beam and adjusting its polarization to match the polarization of said reference beam;
   means for combining said reference beam and said reflected beam to allow them to be heterodyned together interferometrically;
   means for detecting; and
   means for measuring preselected properties of said heterodyned beam.

2. A single frequency laser system as presented in claim 1 which further comprises: means for processing and displaying said measured properties of said heterodyned beam.

3. A single frequency laser system as presented in claim 1 wherein the means for measuring preselected properties measures the Doppler shift between the frequencies of the analysis and reference beams.

4. A single frequency laser system as presented in claim 1 wherein said laser source is a solid state holmium laser.

5. A single frequency laser system as presented in claim 1 wherein said laser source is a solid state thulium, holmium:YSGG laser.

6. A single frequency laser system, wherein a high energy pulse signal is generated as an analysis beam and a lower energy flat top pulse is generated as a reference beam, both being generated from a laser source single frequency pulse signal, said laser system capable of providing interferometric type analysis of the two beams when heterodyned, which comprises:
- a laser source which generates a single frequency, plane polarized, high energy pulse signal beam;
- means for splitting said pulse signal beam simultaneously into an analysis beam and a reference beam, said analysis and reference beams holding the plane polarization of said laser source beam;
- means for converting said analysis beam to circular polarization and directing it to a partially reflective external target medium whereby part of said analysis beam becomes a reflected beam returning back upon itself,
- means for reforming said local oscillator beam pulse into a lower energy, flat top signal of a preset time period, said time period set to extend for a minimum time which ensures that said return beam pulse will be overlapped by the reformed local oscillator beam pulse in order that said beams can be heterodyned together;
- means for receiving said reflected beam and adjusting its polarization to match the polarization of said reference beam;
- means for combining said reference beam and said reflected beam to allow them to be heterodyned together interferometrically;
- means for detecting; and
- means for measuring preselected properties of said heterodyned beam.

7. A single frequency laser system as presented in claim 6 which further comprises: means for processing and displaying said measured properties of said heterodyned beam.

8. A single frequency laser system as presented in claim 6 wherein the means for measuring preselected properties measures the Doppler shift between the frequencies of the analysis and reference beams.

9. A laser radar system which comprises:
- a laser source which emits a single frequency, plane polarized, high energy pulse;
- means for splitting said high energy pulse emitted by said laser source into a target beam pulse and a local oscillator beam pulse;
- means for controlling the polarization of said target beam pulse and directing it to an external, partially reflective medium whereby part of the energy of said target beam pulse becomes a reflected beam to return to said laser radar system;
- means for reforming said local oscillator beam pulse into a lower energy, flat top signal of a frequency shifted a preselected amount from said local oscillator's original frequency and of a preset time period, said time period set to extend for a minimum time which ensures that said return beam pulse will be overtapped by the reformed local oscillator beam pulse in order that said beams can be heterodyned together;
- means for receiving said reflected beam pulse and adjusting its polarization to match said reformed local oscillator beam pulse;
- means for combining said local oscillator beam and said reflected beam to allow them to be heterodyned together interferometrically; and
- detecting means.

10. A laser radar system according to claim 9 which further comprises:
- means for analyzing a signal from said detector.

11. A laser radar system according to claim 10 which further comprises:
- means for analyzing a signal from said detector for a Doppler shift between the heterodyned beams.

12. A laser radar system for measuring the air speed of an aircraft which comprises:
- a laser source which emits a single frequency, plane polarized, high energy pulse;
- means for splitting said high energy pulse emitted by said laser source into a target beam pulse and a local oscillator beam pulse;
- means for controlling the polarization of said target beam pulse and directing it to an external, atmospheric aerosol medium whereby part of the energy of said target beam pulse becomes a reflected beam to return to said laser radar system;
- means for reforming said local oscillator beam pulse into a lower energy, flat top signal of a preset time period, said time period set to extend for a minimum time which ensures that said return beam pulse will be overlapped by the reformed local oscillator beam pulse in order that said beams can be heterodyned together;
- means for receiving said reflected beam pulse and adjusting its polarization to match said reformed local oscillator beam pulse;
- means for combining said local oscillator beam and said reflected beam to allow them to be heterodyned together interferometrically;
- detecting means; and
- means connected to said detecting means for determining and displaying the relative airspeed of the aircraft.

13. A single frequency laser system as presented in claim 12 wherein said laser source is a solid state holmium laser.

14. A single frequency laser system as presented in claim 12 wherein said laser source is a solid state thulium, holmium:YSGG laser.

15. A laser radar system for measuring the air speed of an aircraft which comprises:
- a laser source which emits a single frequency, plane polarized, high energy pulse;
- means for splitting said high energy pulse emitted by said laser source into a target beam pulse and a local oscillator beam pulse;
- means for controlling the polarization of said target beam pulse and directing it to an external, atmospheric aerosol medium whereby part of the energy of said target beam pulse becomes a reflected beam to return to said laser radar system;
- means for reforming said local oscillator beam pulse into a lower energy, flat top signal of a frequency shifted a preselected amount from said local oscillato's original frequency and of a preset time period, said time period set to extend for a minimum time which ensures that said return beam pulse will be overlapped by the reformed local oscillator beam pulse in order that said beams can be heterodyned together;

means for receiving said reflected beam pulse and adjusting its polarization to match said reformed local oscillator beam pulse;

means for combining said local oscillator beam and said reflected beam to allow them to be heterodyned together interferometrically;

detecting means; and means for determining and displaying the relative airspeed of the aircraft.

16. A single frequency laser system as presented in claim 15 wherein said laser source is a solid state holmium laser.

17. A single frequency laser system as presented in claim 15 wherein said laser source is a solid state thulium, holmium:YSGG laser.

18. A laser radar system which comprises:

a laser source which emits a single frequency, plane polarized, high energy pulse with pulse width $\tau_P$;

means for splitting said high energy pulse emitted by said laser source into a target beam pulse and a local oscillator beam pulse;

means for controlling the polarization of said target beam pulse and directing it to an external, partially reflective medium whereby part of the energy of said target beam pulse becomes a reflected beam to return to said laser radar system;

means for reforming said reference beam into a lower energy, flat top signal of a preset time period equal to $C\tau_P$ and set to extend for a time period which covers the transit time of said analysis beam to a target medium and back to said laser system;

means for receiving said reflected beam pulse and adjusting its polarization to match said reformed local oscillator beam pulse;

means for combining said local oscillator beam and said reflected beam to allow them to be heterodyned together interferometrically; and detecting means.

19. A laser radar system according to claim 18 which further comprises:

means for analyzing a signal from said detector.

20. A laser radar system according to claim 18 which further comprises:

means for analyzing a signal from said detector for a Doppler shift between the heterodyned beams.

21. A laser radar system which comprises:

a laser source which emits a single frequency, plane polarized, high energy pulse with pulse width $\tau_P$;

means for splitting said high energy pulse emitted by said laser source into a target beam pulse and a local oscillator beam pulse;

means for controlling the polarization of said target beam pulse and directing it to an external, partially reflective medium whereby part of the energy of said target beam pulse becomes a reflected beam to return to said laser radar system;

means for reforming said local oscillator beam pulse into a lower energy, flat top signal of a frequency shifted a preselected amount from said local oscillator's original frequency and of a preset time period equal to $C\tau_P$, said time period set to extend for a time which ensures that said return beam pulse will be overlapped by the reformed local oscillator beam pulse in order that said beams can be heterodyned together;

means for receiving said reflected beam pulse and adjusting its polarization to match said reformed local oscillator beam pulse;

means for combining said local oscillator beam and said reflected beam to allow them to be heterodyned together interferometrically; and detecting means.

22. A laser radar system according to claim 21 which further comprises:

means for analyzing a signal from said detector.

23. A laser radar system according to claim 21 which further comprises:

means for analyzing a signal from said detector for a Doppler shift between the heterodyned beams.

24. A laser radar system which comprises:

a laser source which emits a single frequency, plane polarized, high energy pulse with pulse width $\tau_P$ and an envelope approximating $P(t) = P_0 e^{-(t/\tau_P)^2}$ where $P_0$ is the laser peak power and t is time;

means for splitting said high energy pulse emitted by said laser source into a target beam pulse and a local oscillator beam pulse;

means for controlling the polarization of said target beam pulse and directing it to an external, partially reflective medium whereby part of the energy of said target beam pulse becomes a reflected beam to return to said laser radar system;

means for reforming said local oscillator beam pulse into a lower energy, flat top signal approximating the function $P_{AOM}(t) \approx \eta [V_{RF}(t-t_d)]^2 rP(t)$ where $\eta$ is the AOM deflection efficiency, $V_{RF}$ is the applied voltage, $t_d$ is the time delay associated with said reforming means, and r is the fraction of the laser energy directed toward said reforming means, and with a frequency shifted a preselected amount from said local oscillator's original frequency, and of a preset time period equal to $C\tau_P$, said time period set to extend for a time which ensures that said return beam pulse will be overlapped by the reformed local oscillator beam pulse in order that said beams can be heterodyned together, means for receiving said reflected beam pulse and adjusting its polarization to match said reformed local oscillator beam pulse;

means for combining said local oscillator beam and said reflected beam to allow them to be heterodyned together interferometrically; and detecting means.

25. A laser radar system according to claim 24 which further comprises:

means for analyzing a signal from said detector.

26. A laser radar system according to claim 24 which further comprises:

means for analyzing a signal from said detector for a Doppler shift between the heterodyned beams.

27. A method for a laser radar system which comprises:

generating a single frequency, plane polarized, high energy laser pulse with pulse width $\tau_P$;

splitting said high energy laser pulse into a target beam pulse and a local oscillator beam pulse;

controlling the polarization of said target beam pulse and directing it to an external, partially reflective medium whereby part of the energy of said target beam pulse becomes a reflected beam to return to said laser radar system;

reforming said reference beam into a lower energy, flat top signal of a preset time period equal to $C\tau_P$ and set to extend for a time period which covers the transit time of said analysis beam to a target medium and back to said laser system;

receiving said reflected beam pulse and adjusting its polarization to match said reformed local oscillator beam pulse; and combining said local oscillator beam and said reflected beam to allow them to be heterodyned together interferometrically.

28. A method as presented in claim 27 which further comprises the step of:

detecting, analyzing and displaying preselected properties of said heterodyned beam.

29. A method for a laser radar system which comprises:

generating a single frequency, plane polarized, high energy laser pulse with pulse width $\tau_P$;

splitting said high energy laser pulse into a target beam pulse and a local oscillator beam pulse;

controlling the polarization of said tar-get beam pulse and directing it to an external, partially reflective medium whereby part of the energy of said target beam pulse becomes a reflected beam to return to said laser radar system;

reforming said local oscillator beam pulse into a lower energy, flat top signal of a frequency shifted a preselected amount from said local oscillato's original frequency and of a preset time period equal to $C\tau_P$, said time period set to extend for a time which ensures that said return beam pulse will be overlapped by the reformed local oscillator beam pulse in order that said beams can be heterodyned together;

receiving said reflected beam pulse and adjusting its polarization to match said reformed local oscillator beam pulse; and combining said local oscillator beam and said reflected beam to allow them to be heterodyned together interferometrically.

30. A method as presented in claim 29 which further comprises the step of:

detecting, analyzing and displaying preselected properties of said heterodyned beam.

31. A method for a laser radar system for measuring the air speed of an aircraft which comprises:

generating a single frequency, plane polarized, high energy laser pulse;

splitting said high energy laser pulse into a target beam pulse and a local oscillator beam pulse;

controlling the polarization of said target beam pulse and directing it to an external, atmospheric aerosol medium whereby part of the energy of said target beam pulse becomes a reflected beam to return to said laser radar system;

reforming said local oscillator beam pulse into a lower energy, flat top signal of a preset time period, said time period set to extend for a minimum time which ensures that said return beam pulse will be overlapped by the reformed local oscillator beam pulse in order that said beams can be heterodyned together;

receiving said reflected beam pulse and adjusting its polarization to match said reformed local oscillator beam pulse;

combining said local oscillator beam and said reflected beam to allow them to be heterodyned together interferometrically; and detecting, determining and displaying the relative airspeed of the aircraft from the heterodyned beam.

32. A method for a laser radar system for measuring the air speed of an aircraft which comprises:

generating a single frequency, plane polarized, high energy laser pulse;

splitting said high energy laser pulse into a target beam pulse and a local oscillator beam pulse;

controlling the polarization of said target beam pulse and directing it to an external, atmospheric aerosol medium whereby part of the energy of said target beam pulse becomes a reflected beam to return to said laser radar system;

reforming said local oscillator beam pulse into a lower energy, flat top signal of a frequency shifted a preselected amount from said local oscillator's original frequency and of a preset time period, said time period set to extend for a minimum time which ensures that said return beam pulse will be overlapped by the reformed local oscillator beam pulse in order that said beams can be heterodyned together;

receiving said reflected beam pulse and adjusting its polarization to match said reformed local oscillator beam pulse;

combining said local oscillator beam and said reflected beam to allow them to be heterodyned together interferometrically;

detecting, determining and displaying the relative airspeed of the aircraft from the heterodyned beam.

33. A method for laser radar system which comprises:

generating a single frequency, plane polarized, high energy laser pulse with pulse width $\tau_P$ and an envelope approximating $P(t) = P_0 e^{-(t/\tau_P)^2}$ where $P_0$ is the laser peak power and t is time;

splitting said high energy laser pulse into a target beam pulse and a local oscillator beam pulse;

controlling the polarization of said target beam pulse and directing it to an external, partially reflective medium whereby part of the energy of said target beam pulse becomes a reflected beam to return to said laser radar system;

reforming said local oscillator beam pulse into a lower energy, flat top signal approximating the function $P_{AOM}(t) \approx \eta [V_{RF}(t - t_d)]^2 r P(t)$ where $\eta$ is the AOM deflection efficiency, $V_{RF}$ is the applied voltage, $t_d$ is the time delay associated with said reforming means, and r is the fraction of the laser energy directed toward said reforming means, and with a frequency shifted a preselected amount from said local oscillator's original frequency, and of a preset time period equal to $C\tau_P$, said time period set to extend for a time which ensures that said return beam pulse will be overtapped by the reformed local oscillator beam pulse in order that said beams can be heterodyned together;

receiving said reflected beam pulse and adjusting its polarization to match said reformed local oscillator beam pulse; and combining said local oscillator beam and said reflected beam to allow them to be heterodyned together interferometrically.

34. A method as presented in claim 33 which further comprises the step of:

detecting, analyzing and displaying preselected properties of said heterodyned beam.

35. A method for a self seeding laser radar system which comprises:

generating a single frequency, plane polarized, high energy laser pulse width pulse width $\tau_P$;

splitting said high energy laser pulse into a target beam pulse and a local oscillator beam pulse;

controlling the polarization of said target beam pulse and directing it to an external, partially reflective medium whereby part of the energy of said target beam pulse becomes a reflected beam to return to said laser radar system;

reforming said reference beam into a lower energy, flat top signal of a preset time period equal to $C\tau_P$ and set to extend for a time period which covers the transit time of said analysis beam to a target medium and back to said laser system;

receiving said reflected beam pulse and adjusting its polarization to match said reformed local oscillator beam pulse; and combining said local oscillator beam and said reflected beam to allow them to be heterodyned together interferometrically.

36. A method as presented in claim 35 which further comprises the step of:

detecting, analyzing and displaying preselected properties of said heterodyned beam.

37. A method for a self seeding laser radar system which comprises:

generating a single frequency, plane polarized, high energy laser pulse with pulse width $\tau_P$;

splitting said high energy laser pulse into a target beam pulse and a local oscillator beam pulse;

controlling the polarization of said target beam pulse and directing it to an external, partially reflective medium whereby part of the energy of said target beam pulse becomes a reflected beam to return to said laser radar system;

reforming said local oscillator beam pulse into a lower energy, flat top signal of a frequency shifted a preselected amount from said local oscillato's original frequency and of a preset time period equal to $C\tau_P$, said time period set to extend for a time which ensures that said return beam pulse will be overlapped by the reformed local oscillator beam pulse in order that said beams can be heterodyned together;

receiving said reflected beam pulse and adjusting its polarization to match said reformed local oscillator beam pulse; and combining said local oscillator beam and said reflected beam to allow them to be heterodyned together interferometrically.

38. A method as presented in claim 29 which further comprises the step of:

detecting, analyzing and displaying preselected properties of said heterodyned beam.

* * * * *